US008195859B2

(12) United States Patent
Le Moal

(10) Patent No.: US 8,195,859 B2
(45) Date of Patent: Jun. 5, 2012

(54) TECHNIQUES FOR MANAGING PROCESSOR RESOURCE FOR A MULTI-PROCESSOR SERVER EXECUTING MULTIPLE OPERATING SYSTEMS

(75) Inventor: Damien Le Moal, Machida (JP)

(73) Assignee: Hitachi, Ltd., Tokyo (JP)

( * ) Notice: Subject to any disclaimer, the term of this patent is extended or adjusted under 35 U.S.C. 154(b) by 643 days.

(21) Appl. No.: 12/308,658

(22) PCT Filed: Dec. 3, 2008

(86) PCT No.: PCT/JP2008/003577
§ 371 (c)(1),
(2), (4) Date: Dec. 19, 2008

(87) PCT Pub. No.: WO2010/064277
PCT Pub. Date: Jun. 10, 2010

(65) Prior Publication Data
US 2011/0191783 A1 Aug. 4, 2011

(51) Int. Cl.
*G06F 12/00* (2006.01)
(52) U.S. Cl. .......... 710/200; 710/240; 711/153
(58) Field of Classification Search .......... 710/200, 710/240–244, 260–269, 305–306; 718/100–105; 711/153
See application file for complete search history.

(56) References Cited

U.S. PATENT DOCUMENTS

| | | | |
|---|---|---|---|
| 6,260,068 B1 * | 7/2001 | Zalewski et al. | 709/226 |
| 6,647,508 B2 | 11/2003 | Zalewski et al. | |
| 6,931,640 B2 | 8/2005 | Asano et al. | |
| 7,870,551 B2 * | 1/2011 | Anand et al. | 718/1 |
| 2002/0087611 A1 | 7/2002 | Tanaka et al. | |
| 2003/0037092 A1 | 2/2003 | McCarthy et al. | |
| 2004/0199632 A1 * | 10/2004 | Romero et al. | 709/226 |
| 2008/0082983 A1 * | 4/2008 | Groetzner et al. | 718/105 |

OTHER PUBLICATIONS

International Search Report of PCT/JP2008/003577, mailed Aug. 5, 2009.

* cited by examiner

*Primary Examiner* — Brian Misiura
*Assistant Examiner* — Kim Huynh
(74) *Attorney, Agent, or Firm* — Stites & Harbison, PLLC; Juan Carlos A. Marquez, Esq.

(57) ABSTRACT

A multiprocessor server system executes a plurality of multiprocessor or single-processor operating systems each using a plurality of storage adapters and a plurality of network adapters. Each operating system maintains load information about all its processors and shares the information with other operating systems. Upon changes in the processor load of the operating systems, processors are dynamically reassigned among operating systems to improve performance if the maximum load of the storage adapters and network adapters of the reassignment target operating system is not already reached. Processor reassignment includes shutting down and restarting dynamically operating systems to allow the reassignment of the processors used by single-processor operating systems. Furthermore, the process scheduler of multiprocessor operating systems keeps some processors idle under light processor load conditions in order to allow the immediate reassignment of processors to heavily loaded operating systems.

5 Claims, 9 Drawing Sheets

Figure 3

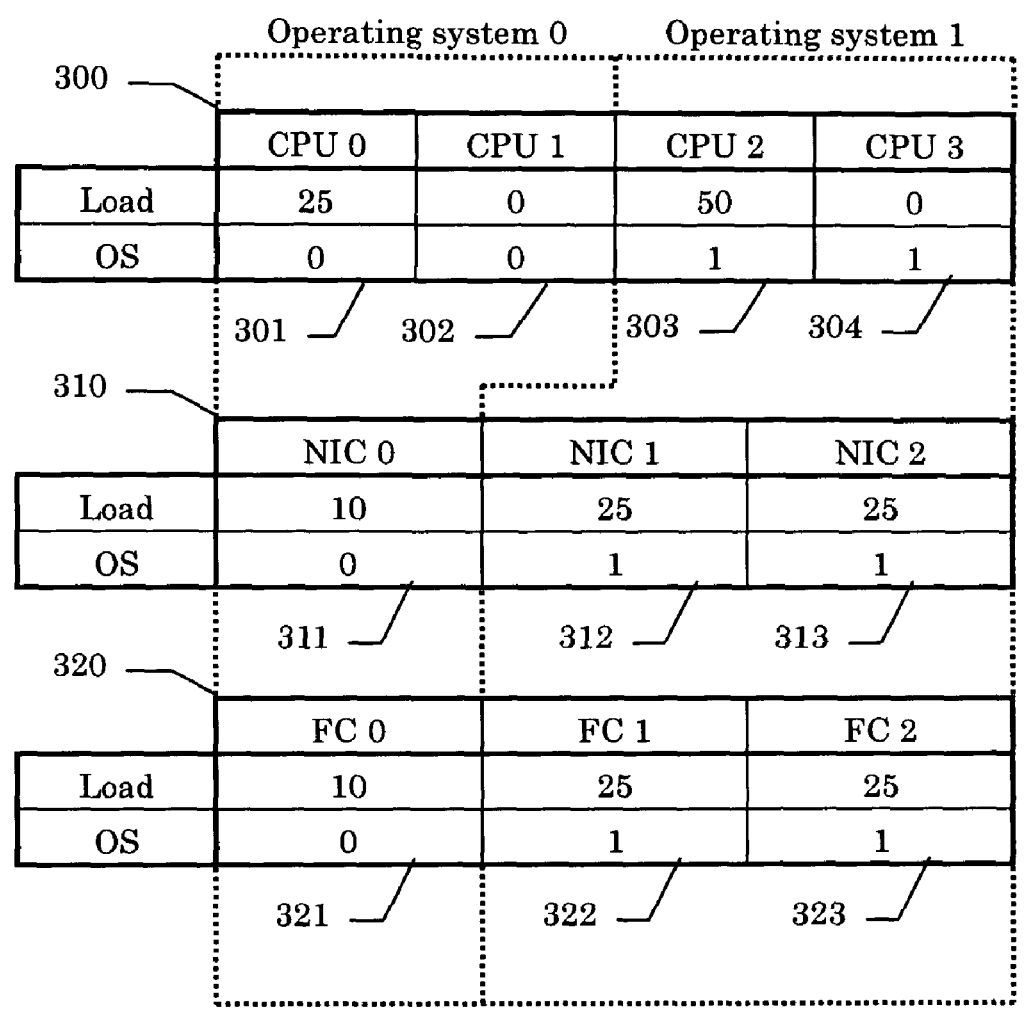

| | Operating system 0 | | Operating system 1 | |
|---|---|---|---|---|
| | CPU 0 | CPU 1 | CPU 2 | CPU 3 |
| Load | 25 | 0 | 50 | 0 |
| OS | 0 | 0 | 1 | 1 |

300

301  302  303  304

| | NIC 0 | NIC 1 | NIC 2 |
|---|---|---|---|
| Load | 10 | 25 | 25 |
| OS | 0 | 1 | 1 |

310

311  312  313

| | FC 0 | FC 1 | FC 2 |
|---|---|---|---|
| Load | 10 | 25 | 25 |
| OS | 0 | 1 | 1 |

| 400 | Operating system 0 | | Operating system 1 | |
|---|---|---|---|---|
| | CPU 0 | CPU 1 | CPU 2 | CPU 3 |
| Load | 28 | 0 | 75 | 10 |
| OS | 0 | 0 | 1 | 1 |
| | 401 | 402 | 403 | 404 |

| 410 | | | |
|---|---|---|---|
| | NIC 0 | NIC 1 | NIC 2 |
| Load | 12 | 50 | 50 |
| OS | 0 | 1 | 1 |
| | 411 | 412 | 413 |

| 420 | | | |
|---|---|---|---|
| | FC 0 | FC 1 | FC 2 |
| Load | 12 | 50 | 50 |
| OS | 0 | 1 | 1 |
| | 421 | 422 | 423 |

Figure 5

| | Operating system 0 | Operating system 1 | | |
|---|---|---|---|---|
| | CPU 0 | CPU 1 | CPU 2 | CPU 3 |
| Load | 30 | 10 | 75 | 75 |
| OS | 0 | 1 | 1 | 1 |
| | 501 | 502 | 503 | 504 |

| | NIC 0 | NIC 1 | NIC 2 |
|---|---|---|---|
| Load | 15 | 90 | 90 |
| OS | 0 | 1 | 1 |
| | 511 | 512 | 513 |

| | FC 0 | FC 1 | FC 2 |
|---|---|---|---|
| Load | 15 | 90 | 90 |
| OS | 0 | 1 | 1 |
| | 521 | 522 | 523 |

500 — (CPU table)
510 — (NIC table)
520 — (FC table)

TECHNIQUES FOR MANAGING PROCESSOR RESOURCE FOR A MULTI-PROCESSOR SERVER EXECUTING MULTIPLE OPERATING SYSTEMS

TECHNICAL FIELD

The present invention generally relates to a multi-processor server executing multiple operating systems.

BACKGROUND ART

Most modern operating systems (OS) support symmetric multiprocessing (SMP), a technique hiding the number of processors available for use to applications by automatically distributing the execution of processes among the available processors and executing processes using time-sharing techniques. Using such kind of operating system, a server system performance can be simply increased using several central processing units (CPU) or multi-core CPUs to increase the number of processors available for executing application processes.

However, in some cases, executing a single instance of an SMP capable operating system on a multiprocessor server system may not be the most effective method to implement a high performance server system. Indeed, many operating systems are designed as general-purpose, without a particular type of workload as a target. A result of such design policy is that high performance processing can be achieved for only a small subset of the possible workloads of the server system. A typical example is a file server implementing remote accesses to files stored on a storage system attached to the server. A multi-processor server using a general purpose operating system is likely to deliver acceptable performance in the case of best-effort accesses to small files, but may have its performance degraded if the load is changed to real-time accesses to large files such as video files.

An efficient solution to this problem is to execute on the server system several types of operating systems to efficiently handle each type of load on the server. Each operating system is assigned a subset of the available processors for processing their workload. Methods have been disclosed in the past, such as U.S. Pat. No. 6,647,508B2, presenting methods for executing several operating systems on a single multiprocessor server system. Other methods such as U.S. Pat. No. 6,931,640B2 and US2002/0087611A1 also introduces methods for dynamically reallocating physical resources, e.g. memory and CPUs, to operating systems to adjust the maximum performance achievable by applications executed on each operating system of the server.

DISCLOSURE OF INVENTION

Technical Problem

However, the above disclosed methods mainly base their reallocation decisions on only CPU and memory usage observed in each operating system (or logical partition) of the server system. In the case of a file server, where the performance achieved is measured in terms of amount of file data received or transferred (throughput), such metrics are not adapted to implement efficient resource re-allocation decision. In addition, the use of SMP capable operating systems renders the operation of CPU re-allocation to another operating system difficult: because the execution of application processes is by default distributed evenly among the available processors, at any time, all processors may be busy executing processes. A method for allowing a lightly loaded operating system to release one of its processor to another operating system requires modification to the operating system process scheduler. Also, a new method for estimating if processor reallocation will increase performance is required.

Technical Solution

The main feature of the invention disclosed here is as follows. A multiprocessor computer system comprising a plurality of processors, a plurality of storage system adapters connected to a storage system, a plurality of network adapters connected to a network, and a memory storing a plurality of operating systems each of which is executed using a subset of the plurality of processors. Each of the plurality of processors, storage system adaptors and network adapters are assigned to one of the plurality of operating systems, and the operating systems specify at least one of the plurality of processors assigned to the operating system that are in a low load condition and maintains the specified processors idle.

Advantageous Effects

The present invention can improve a file server ability to process a higher number of client requests of different types processed by different operating systems. The dynamic reassignment of an idle processor to a highly loaded operating system increases the ability of that operating system to use both its network adapters and storage system adapters at their maximum performance, that is, to maximize the throughput of the file server for the client request type processed by the operating system.

BRIEF DESCRIPTION OF DRAWINGS

FIG. 3 illustrates an example of data maintained by the load monitor.

FIG. 4 illustrates another example of the data maintained by the load monitor.

FIG. 5 illustrates another example of the data maintained by the load monitor.

EXPLANATION OF REFERENCE

Figure 1:
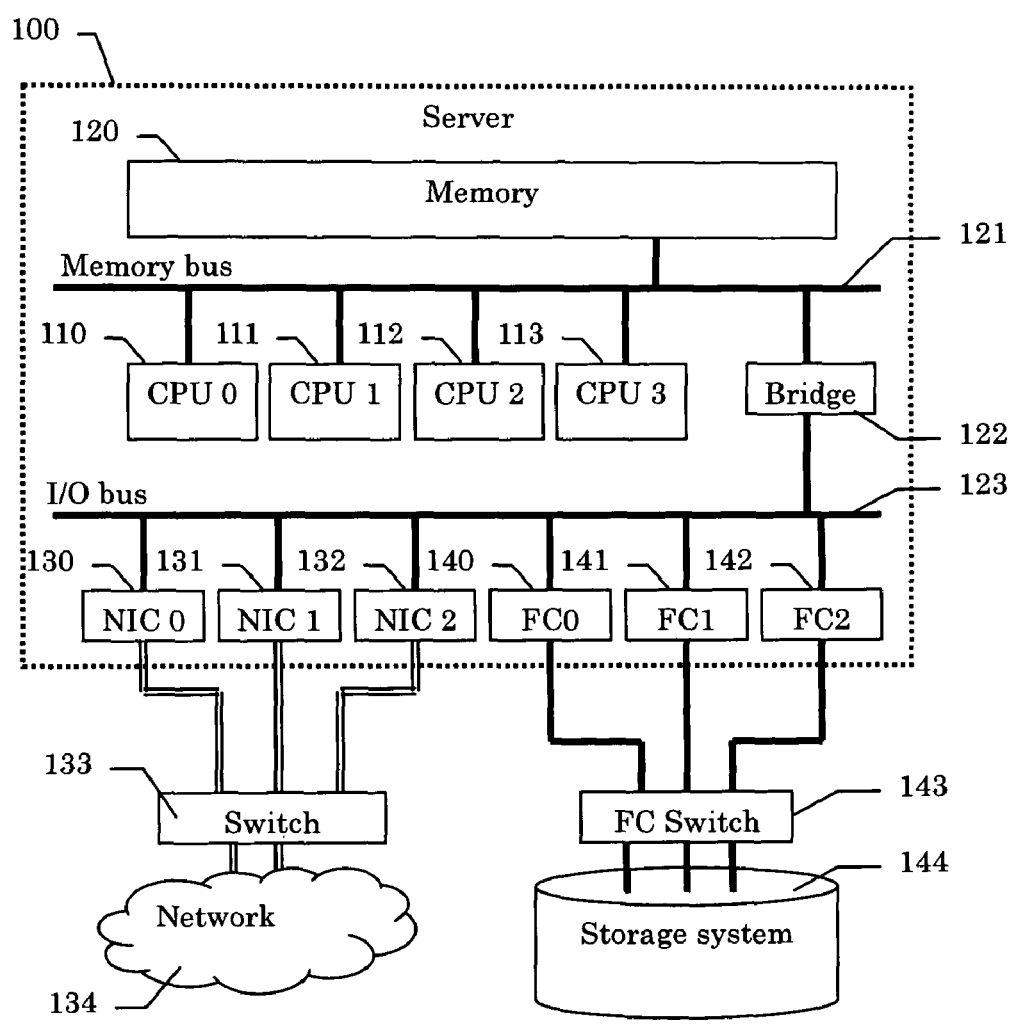
FIG. 1 is a block diagram that illustrates an example of typical SMP multiprocessor system.

100 server
120 memory
200 operating system 201 operating system
230 load monitor

BEST MODE FOR CARRYING OUT THE INVENTION

File server systems such as web servers or NFS servers are evolving to support advanced features such as multimedia content access or delivery. Providing such features with a traditional server system results in a mixed workload: text or image based content files typically used to implement web pages are accessed and delivered in a best effort manner (as fast as possible), whereas multimedia content such as video and audio files require real-time data access and delivery to allow for a smooth playback on the client side. General purpose operating systems often lack the real-time capabilities required for handling efficiently multimedia content, resulting in a poor quality of service when both workloads are served by a single server system built upon a general purpose operating system.

In addition, general purpose operating systems are generally designed to speedup accesses to small files through the use of caching of file data into the operating system controlled memory. On the other hand, the larger size in average of multimedia files and their sequential access nature renders data caching inefficient, hence their processing by a traditional general purpose operating system inefficient.

Executing several different operating systems on a multi-processor server can greatly improve the quality of service for real-time accesses. A specialized operating system, optimized for instance for video file delivery, can be executed simultaneously with a traditional operating system used for handling best-effort file data, with the result of preserving and even improving the overall server performance. Also, this method can be more desirable compared to a traditional approach of using physically different server systems: maximizing the use of only a single server results in lower maintenance, housing and power consumption costs.

Executing several operating systems on different processors of a single server is not a new method. However, efficiently implementing it in a mixed workload file server with dedicated operating systems for each type of load requires a dynamic re-allocation scheme of processors to maximize the overall system performance. Indeed, as the load ratio of best-effort file processing against real-time file processing changes depending on client requests, re-allocation of processors among the operating systems executed can improve overall performance compared to a static assignment of processors which may not result in an efficient processing of all types of workload.

Dynamically reassigning processors to operating systems faces several challenges. First, the process scheduler of a traditional operating system generally distribute evenly processes amongst the processor controlled by the operating system to increase the processor time that can be allocated to each process, hence decreasing the processing time necessary for the completion of the processes. This method may keep the processors of an operating system from idling, that is, the processors are used often, showing a non-zero CPU load. When implementing dynamic processor reallocation among multiple operating systems, the absence of idle processors may prevent any efficient reallocation decision.

Next, the maximum performance that can be achieved by a file server does not depend solely on its processor load: if storage access throughput and network access throughput are already at their maximum, increasing the number of processors will not increasing the performance achieved by an operating system of the file server. Basing a decision solely on the operating system processor load may result in inefficient distribution of processors.

Finally, as the workload ratio between best-effort and real-time may tip to one of the two possible extremes, that is, only one type of workload is present, the system should be able to fully assigns all processors to only a single type of operating system by allowing shutting down completely an operating system and restarting it when the workload ratio changes.

Some embodiments of the present invention mitigate the performance problem by using a different approach to processor dynamic allocation management. Particular embodiments of the present invention reduce the latency of processor reallocation by enhancing the scheduling of processes in each operating system so that if a processor can be reassigned to a different operating system, it is kept idle.

As described in more detail below, in one embodiment, the system includes a data storage device accessible from a plurality of communication ports, a plurality of network adapters and at least two different operating systems executed on one or more processors of the server. Each operating system includes a process scheduler determining on which processor a process should be executed. The scheduler base its decision on the current load of used processors and on the current throughput of the storage device port used and of the network adapter used. These parameters are measured by each operating system and shared among all operating systems executed on the server to allow each operating system to request the reallocation of idle processors to another operating system.

The process scheduler of each operating system defers choosing an idle processor for executing a process until the load of currently used processors exceeds a programmable threshold indicating a potential overload of the processors. If the threshold is exceeded, the process scheduler may choose an idle processor for executing one or more process. If no idle processor is available, the operating system may request the reallocation of an idle processor of another operating system unless the current throughput of the ports used to access the storage device or the current throughput of its network adapters have reach their maximum.

Although the present invention disclosed herein is described in the context of file servers with a mixed workload of best-effort and real-time file accesses, the present invention can apply to other types of systems and other types of services, such as application servers, and still remain within the spirit and scope of the present invention.

FIG. 1 is a block diagram that illustrates an example of typical SMP architecture server system that can implement techniques of the present invention. The server 100 shown in FIG. 1 includes four processors 110, 111, 112 and 113 accessing a common shared memory 120 through a memory bus 121. Using the bridge 122 connected to the memory bus, all processors also have access to devices connected to the I/O bus 123. The server 100 is equipped with three network adapters 130, 131 and 132 accessing a network 134 through a switch 133. The server has access to a storage system 144 using three fiber channel adapters 140, 141 and 142 connected to a fiber channel switch 143. The server 100 common memory 120 stores at least two types of operating systems. While the common memory 120 can be physically accessed equally by all processors, the memory management and protection of the operating systems executed on the server may partition the available memory to implement memory areas accessible to only a single operating system. Likewise, memory areas shared by all operating systems can also be implemented. The present invention is not limited by a maximum number of processors, network adapters and fiber channel adapters present in the system. Usually, the maximum number of processors, network adapters and fiber channel adapters found in a server system is limited by the amount of available processor slots (connectors) and connectors on the I/O bus 123. A client 150 can use the services provided by the server 100 through the network 134. The services provided may include web page serving (web server function), video real-time delivery (streaming) or direct access to files stored on the storage system 144 of the server.

Figure 2:
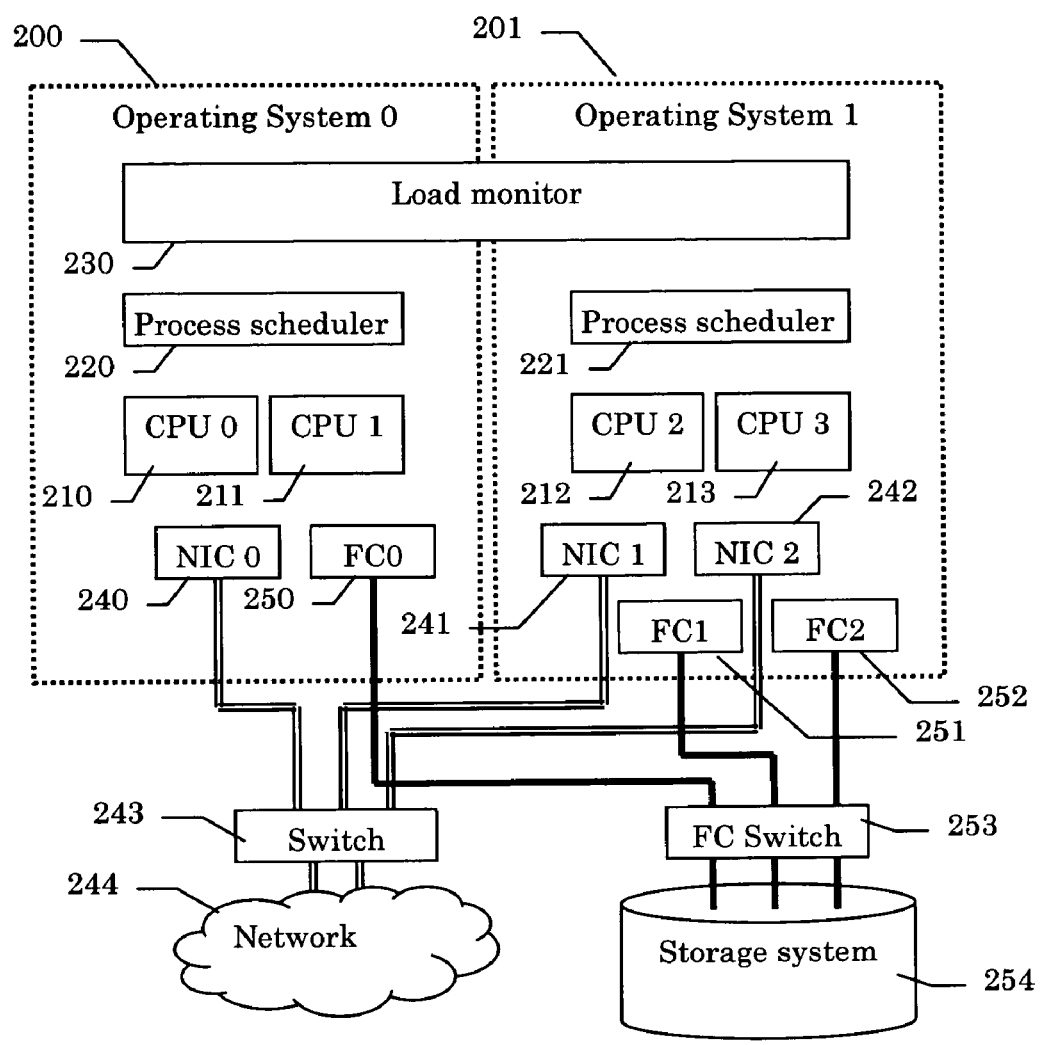
FIG. 2 is a block diagram that illustrates an example of initial configuration of the system represented in FIG. 1 when using two different operating systems.

FIG. 2 is a block diagram that illustrates the logical configuration of the server 100 when using two different types of operating systems. For instance, one operating system 200 may be optimized for efficiently processing client direct accesses to files stored on the storage system 144 and for web page serving, while the other operating system 201 may be optimized for the real-time streaming of video files. Each one of the SMP capable operating systems 200 and 201 are executed using two different processors. The operating system 200 uses processors 210 and 211, while the operating system 201 uses processors 212 and 213. Both operating systems 200 and 201 include a process scheduler (220 and 221 respectively) used to control the execution of application and system level processes and tasks. The load monitor 230 is a memory area shared by both operating systems 200 and 201 and used to store load information of each operating system. The load information data stored using the load monitor is used by all operating systems to determine if a processor reallocation is necessary and possible. Each operating system is granted exclusive use of some of the I/O devices included in the server 100 according to a server configuration determined by, for instance, the system administrator. In the example of FIG. 2, operating system 200 has exclusive use of the network adapter 240 and of the fiber channel adapter 250. Likewise, operating system 201 has exclusive access to the network adapters 241 and 242 and of the fiber channel adapters 251 and 252. All network adapters are connected to a network 244 through a switch 243. All fiber channel adapters implement access to the storage system 254 through the fiber channel switch 253.

The process scheduler of each operating system 200 and 201 cyclically update load data information stored in the load monitor 230.

FIG. 3 illustrates the load information data stored using the load monitor. The load monitor data is organized as a set of three tables. The first table is the CPU load table 300 which indicates the current average load of each processor in the system and the operating system to which the processor is assigned. In the case of the system of FIG. 2, the CPU load table has thus four entries 301, 302, 303 and 304 corresponding respectively to the processors 210, 211, 212 and 213 of FIG. 2. The second table 310 is used to indicate the current average load of each network adapter of the system and the operating system using each device. This table has three entries 311, 312 and 313 corresponding respectively to the state of the network adapters 240, 241 and 242 of FIG. 2. In the example shown, the current load of a network adapter is simply stored as a percentage of its maximum performance, that is, as a percentage of its maximum possible throughput. For instance, a load of 100 mega-bits-per-seconds (Mbps) for an adapter supporting at most 1000 Mbps would result in a value of 10 in the table 310. Finally, the third table 320 of the load monitor is used to indicate the load average and owner operating system of all fiber channel adapters of the server. The three entries 321, 322 and 323 correspond respectively to the fiber channel adapters 250, 251 and 252 of FIG. 2. As for the network adapters load table 310, the current load of fiber channel adapters in table 320 can be expressed as a percentage of the maximum performance of the adapters.

According to a preferred embodiment of the present invention, each operating system executed in the server cyclically updates the load information stored in the load monitor of its processors, network adapters and fiber channel adapters. Under low load conditions, unnecessary processors of an operating system are kept idle by the process scheduler (no processes or tasks are executed on the processor). After an update, the load information of the load monitor is analyzed to detect increases in the operating system load to decide whether a processor reallocation is necessary. FIG. 3 shows a situation where both operating systems 200 and 201 are operating under very low CPU load. For operating system 0 (200), entry 301 of the CPU load table 300 shows a 25% CPU load on CPU 0 and entry 302 shows that CPU 1 is unused (idle). For operating system 1 (201), entry 303 shows a 50% CPU load on CPU 2 and entry 304 shows that CPU 3 is unused (idle).

FIG. 4 shows a new state of the load information after an update by both operating systems: as the CPU load of CPU 2 increased closer to the maximum (entry 403 of table 400), CPU 3 was activated by the operating system process scheduler, e.g., CPU 3 load is non-zero (entry 404 of table 400). On the other hand, as the CPU load of CPU 0 of operating system 0 has not changed significantly (entry 401 of table 400), the second processor of operating system 0 is not activated and kept idle (entry 402 of table 400). Activation of the idle processor of operating system 1 was done under the condition that the load of its network and fiber channel adapters is under the maximum (entries 412 and 413 of table 410 and entries 422 and 423 of table 420), that is, using an additional processor is likely to increase the network and fiber channel adapters throughput (their load), hence increase operating system 1 performance.

Considering a case where the load of operating system 1 further increases, that is, the CPU load of its second processor (CPU 3) increases, a processor reallocation can take place. This situation is shown in FIG. 5. As the load of CPU 3 closes on the maximum (entry 504 of table 500), while the load of the network and fiber channel adapters is still under the maximum allowed (entries 512 and 513 of table 510 and entries 522 and 523 of table 520), processor reallocation is initiated, resulting in the reassignment of the idle CPU 1 of operating system 0 to operating system 1 (entry 502 of table 500).

Figure 6:
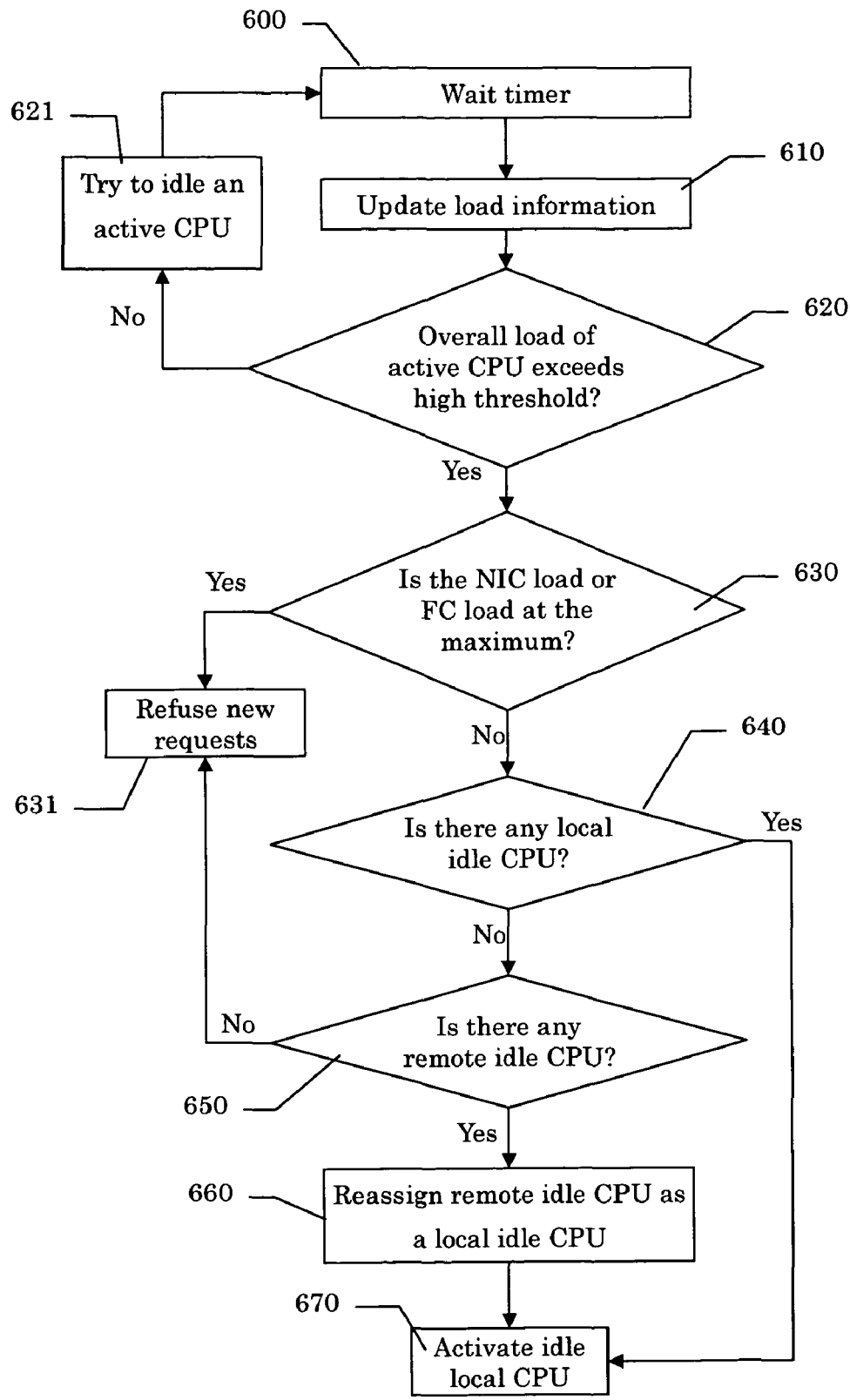
FIG. 6 is a flow chart that illustrates the processing done by each operating system to determine if processor reallocation and/or activation is required and possible.

The complete algorithm executed by each operating system for determining if processor reallocation is necessary and possible is illustrated in FIG. 6.

In a first step 600, an operating system task waits for a timer expiration to perform an update of the load monitor load information (step 610). Upon completion of the load information update, the overall CPU load of the operating system active processors is checked in step 620 to detect if it is above a high threshold (say 75%). The overall CPU load of all active processors assigned to an operating system, can simply be calculated using the information of the CPU load table of the load monitor as shown in equation (1).

[Math. 1]

$$\text{Overall load} = \frac{\sum \text{Load of active processors}}{\text{Number of active processors}} \quad (1)$$

If the overall load of all active processors is below the high threshold defined, the operating system next tries to idle an active CPU in step 621. On the contrary, if the overall load of active CPU is above the defined high threshold, the operating system next test if activating an additional CPU will improve performance by checking that the load of network and fiber channel adapters is below their maximum (step 630). If the load of these adapters is at their maximum, reassigning a processor to the operating system cannot result in an increase of data throughput, hence in an increase of the performance of the server. In such case, the algorithm ends at step 631 without any processor reassignment taking place. This state can only be encountered if the server is overloaded resulting in the services provided by the operating system temporarily refusing new client requests to avoid further increasing the CPU load without the possibility of higher performance, e.g., higher storage and network throughput. If it is determined at step 630 that the network and storage adapters load is not at their maximum, the operating system first tries at step 640 to activate an additional processor by checking if one of its assigned processors is idle, that is, if the current load of one of its processor is zero. If an idle processor is found, this processor is activated at step 670. On the contrary, if all the operating system processors are already activated, the operating system scans the load monitor CPU load table for idle processors available from other operating systems (step 650). If one is available, the operating system performs reallocation of the idle processor to itself by updating the load monitor CPU load table at step 660 and by activating the newly assigned (still idle) processor at step 670. Activation of an idle processor is dependent on the processor type but typically involves the steps of adding the processor to the list of processors usable to execute processes within the operating scheduler and send to the processor a restart signal to re-initialize the processor state (interrupts handlers, virtual memory settings, etc). If no idle processor is available from another operating system, the algorithm ends at step 631, falling into an overload state.

The symmetric operation of processor reallocation is trying to idle an activated processor under low load conditions so that the idle processor can be used by other operating systems with an increasing overall load. This operation is attempted by an operating system upon load monitor information update if the overall load of its active processors is below the high threshold (step 621 of FIG. 6).

Figure 7:
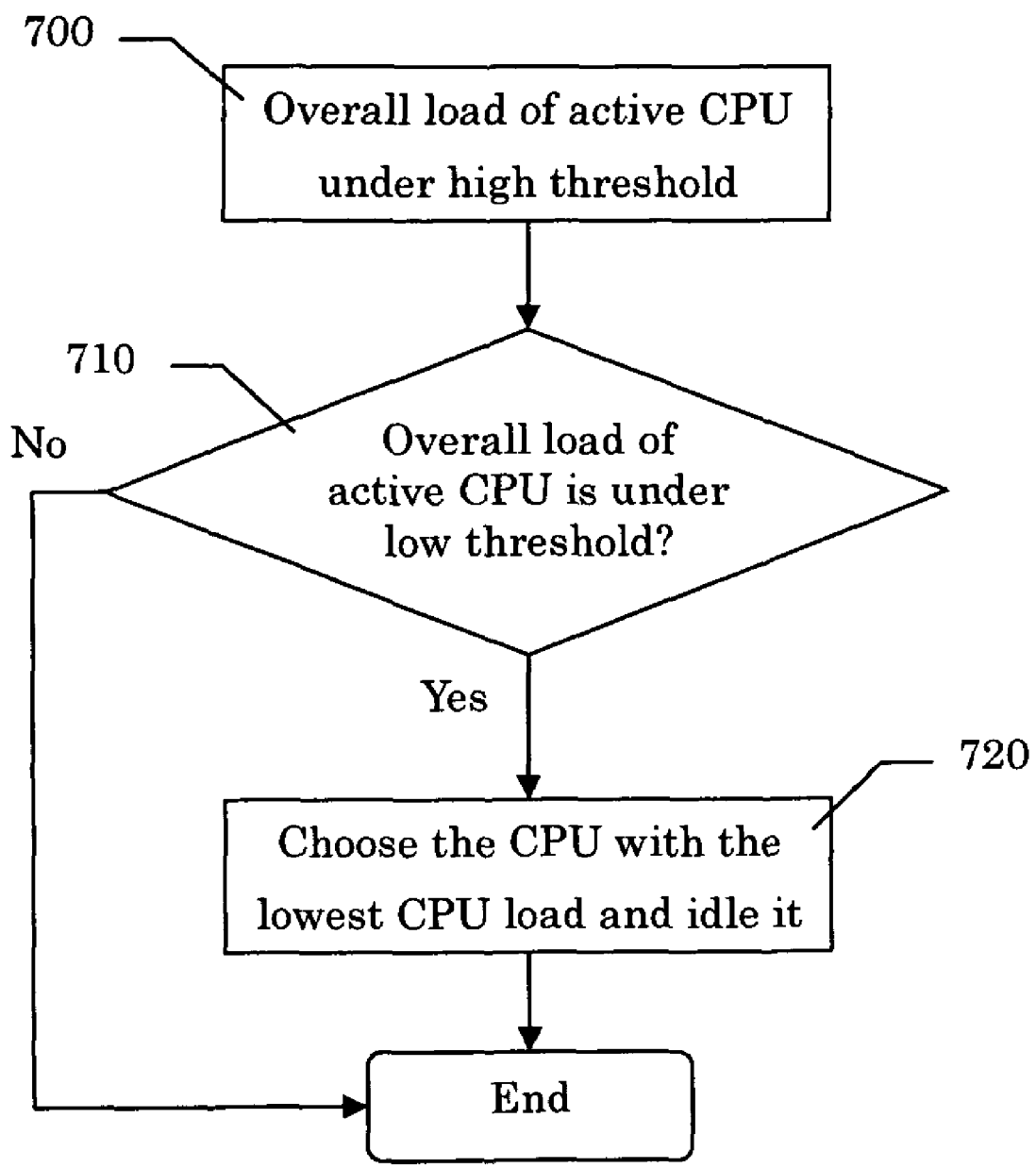
FIG. 7 is a flow chart that illustrates the processing done by each operating system to determine if processor idling is possible.

FIG. 7 is a flow chart illustrating the steps performed by each operating system to try to idle an activated processor. Starting at step 700, which corresponds to step 621 of FIG. 6, the operating system first tests at step 710 if the overall load of its active processors is below a low threshold (say 25%). If yes, the operating system assumes that a processor can be returned to the idle state and chooses the processor with the lowest load as the candidate for idling (step 720). If the overall load of active processors of the operating system is above the low threshold, the processing ends, leaving unchanged the state of the operating systems processors. By idling a processor that otherwise would be used under very low load conditions, an operating system makes it possible to reassign the processor to another operating systems operating under higher load conditions. This results in potential performance increase for the operating system to which the processor is reassigned without degrading the performance of the operating system which idled the processor.

An SMP capable operating system can implement processor activation/idling operations because of the plurality of processors available to it. However, a non SMP operating system only has a single processor which cannot be put into an idle state and reassigned to another SMP operating system unless the operating system is first shut-down or its execution suspended.

In another preferred embodiment of the present invention, an SMP capable operating system can be used in combination with a set of non SMP operating systems (hereafter referred to as UP operating systems) executed on single processors of the server 100. This configuration is shown in FIG. 8.

Figure 8:
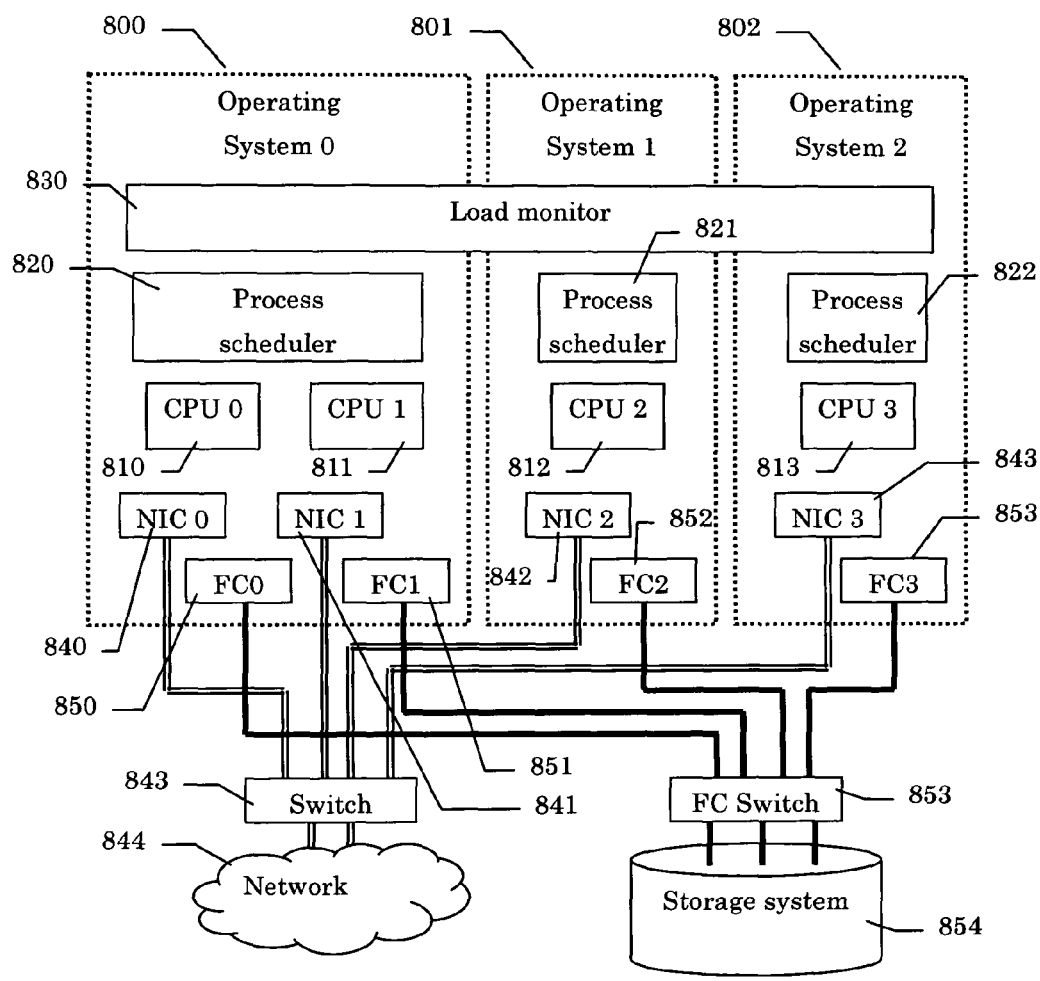
FIG. 8 is a block diagram that illustrates an example of initial configuration of the system represented in FIG. 1 when using a combination of an SMP capable operating system and of a plurality of single processor operating systems.

FIG. 8 is a block diagram that illustrates the logical configuration of a server when using an SMP operating system 800 in combination with a plurality of single-processor (UP) operating systems (801 and 802). Operating system 800 uses CPU 0 and 1 (810 and 811) and is also granted exclusive use of the network adapters 840 and 841 and of the fiber channel adapters 850 and 851. Operating system 801 uses CPU 2 and is allowed to use the network adapter 842 and the fiber channel adapter 852. Finally, operating system 802 uses CPU 3 and is allowed to use the network adapter 843 and the fiber channel adapter 853. All network adapters are connected to the network 844 through the switch 843 while the storage system 854 is accessible to all fiber channel adapters using the switch 853. All operating systems have access to a shared load monitor 830 whose data is updated by the process schedulers 820, 821 and 822.

Figure 9:
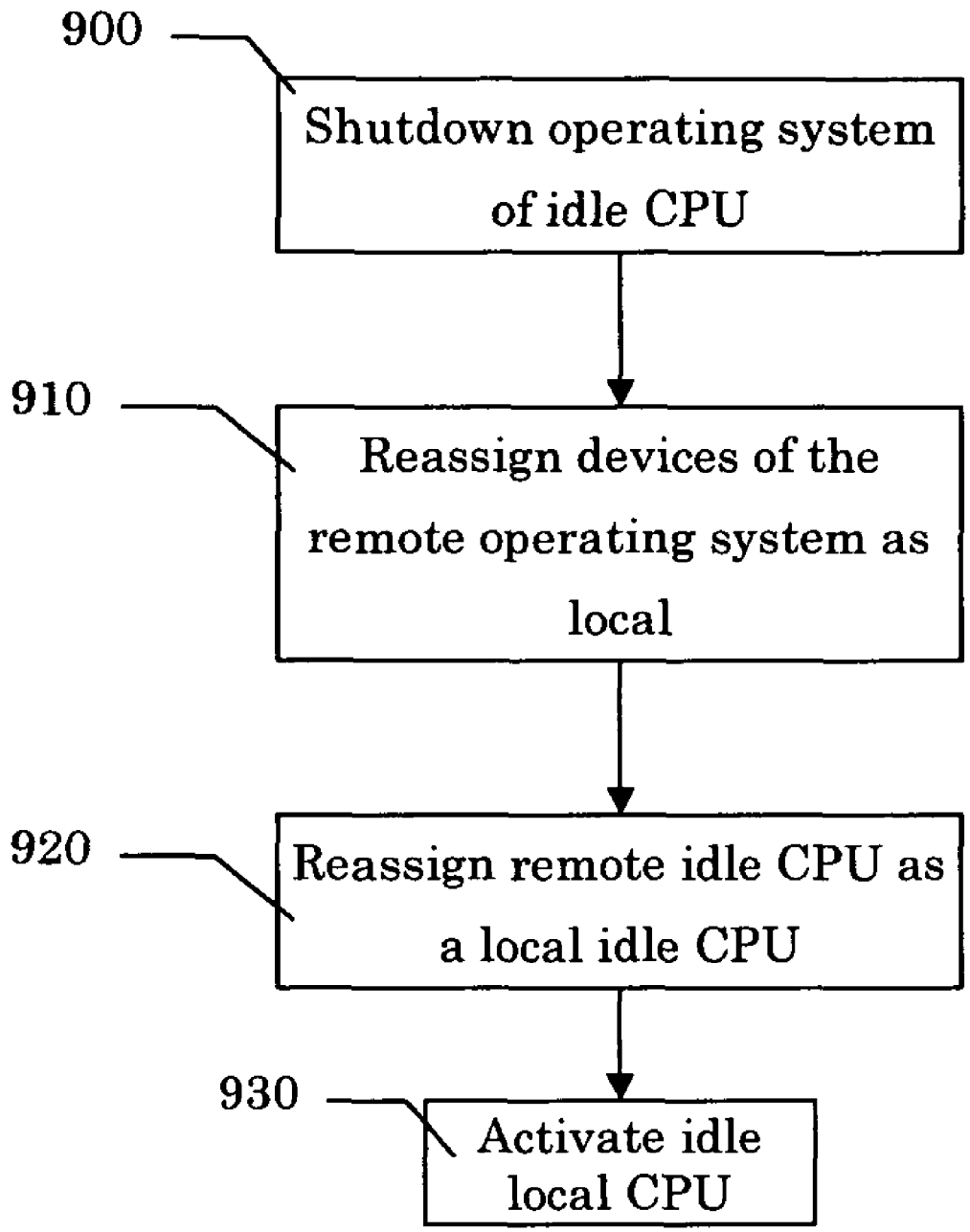
FIG. 9 is a flow chart that illustrates the processing done by an SMP operating system to reassign to itself a processor used by a single-processor operating system.

In the case of an increase in the CPU load of one of the UP operating system 801 or 802, no CPU reallocation take place. On the contrary, the disclosed method can be used to improve the performance of the SMP operating system by allowing the reassignment of one of the processor 812 or 813 to the operating system 800. This operation is performed as shown in FIG. 9. The processing of FIG. 9 corresponds to the step 660 of FIG. 6 when the target idle CPU is assigned to an UP operating system. In this case, the processor of the UP operating system is considered idle if the operating system is not processing any client request, that is, is not delivering any file data to a client.

In a first step 900, the operating system executed on the processor to be reassigned is shutdown. Shutting down an operating system is dependent on the operating system executed and may involve the steps of flushing to the storage device any modified cached data, shutting down the services executed (such as web server) and stopping the execution of all operating system code. Next, at step 910, the load monitor CPU load table is modified to reflect the processor reassignment. Finally, at step 920, the network and fiber channel adapters used by the UP operating system are also reassigned to the same operating system as the processor.

The symmetric operation of idling a processor on the SMP operating system as described in FIG. 7 can also be adjusted to support the SMP and UP operating system combination. Indeed, step 720 can be changed to "Choose the CPU with the lowest CPU load and restart the UP operating system on it" so that the UP operating system that was terminated when the processor was reassigned to the SMP operating system can be restarted to process client requests.

The foregoing description of the exemplary embodiments of the present invention has been presented for the purposes of illustration and description and is not intended to be exhaustive or to limit the scope of the present invention to the examples disclosed. A latitude of modification, various changes, and substitutions are intended in the present invention. In some instances, features of the present invention can be employed without a corresponding use of other features as set forth.

What is claimed is:

1. A multiprocessor computer system, comprising:
a plurality of processors;
a plurality of storage system adapters coupled to a storage system;
a plurality of network adapters coupled to a network; and
a memory storing a plurality of operating systems each of which is executed using a subset of the plurality of processors, and wherein
each of the plurality of processors, storage system adapters and network adapters are assigned to one of the plurality of operating systems,
the operating systems specify at least one of the plurality of processors assigned to the operating systems that are in a low load condition and maintain the specified processors idle,
the plurality of operating systems share information indicating a current load of each of the plurality of processors, the plurality of storage system adapters, and the plurality of the network adapters,
each operating system to which at least one idle processor is assigned activates one of its idle processors when the average load of its active processors increases and activates one of its idle processors when the load of its storage adapters and the load of its network adapters do not exceed their maximum, and
one of the plurality of the operating systems reassigns to itself one of the plurality of processors that is idle and assigned to another operating system when the load of the processors assigned to the one operating system increases.

2. The multiprocessor computer system according to claim 1, wherein the operating system executes processor reassignment when the load of its storage adapters and the load of its network adapters do not exceed their maximum.

3. A multiprocessor computer system, comprising:
a plurality of processors;
a plurality of storage system adapters coupled to a storage system;
a plurality of network adapters coupled to a network; and
a memory storing at least one multiprocessor operating system executed using a subset of the plurality of processors and at least one single-processor operating system executed using ode of the plurality of processors, and wherein
each of the plurality of processors, storage system adapters and network adapters are assigned to one of the at least one multiprocessor operating system or the at least one single-processor operating system,
the at least one multiprocessor operating system specifies at least one of the plurality of processors assigned to the multiprocessor operating system that is in a low load condition and maintains the specified processor idle,
the at least one multiprocessor operating system and the at least one single-processor operating system share information of a current load of each of the plurality of processors, the plurality of storage system adapters, and the plurality of the network adapters, and
the at least one multiprocessor operating system stops the execution of an idle single-processor operating system when its processor load increases above a threshold and reassigns to itself the processor, storage adapters, and network adapters assigned to the stopped single-processor operating system.

4. The multiprocessor computer system according to claim 3; wherein the multiprocessor operating system reassigns to itself the processor, storage adapters and network adapters of an idle single-processor operating system when the load of its storage adapters and network adapters do not exceed their maximum.

5. The multiprocessor computer system according to claim 3; wherein a multiprocessor operating system idles one of its processors if the load of its active processors decreases below a low threshold, and restarts a stopped single-processor operating system using the idled processor.

* * * * *